Aug. 5, 1952   B. B. CORK   2,606,249
TUNABLE CAVITY RESONATOR TRANSMIT-RECEIVE DEVICE
Filed May 2, 1945

INVENTOR.
BRUCE B. CORK
BY
William D. Hall
ATTORNEY

Patented Aug. 5, 1952

2,606,249

UNITED STATES PATENT OFFICE 2,606,249

TUNABLE CAVITY RESONATOR TRANSMIT-RECEIVE DEVICE

Bruce B. Cork, Cambridge, Mass., assignor, by mesne assignments, to the United States of America as represented by the Secretary of War Application May 2, 1945, Serial No. 591,589

5 Claims. (Cl. 178—44)

This invention relates to electrical systems and more particularly to radio systems.

Certain devices have been developed in the prior art for using a spark gap as a protective discharge device. The type of device referred to is usually given the name transmit-receive or T-R devices. A less common name applied to the same devices is signal stops.

The particular type of T-R devices to which this invention relates comprises a first radio frequency transmission means with means for coupling energy from said first radio frequency transmission into a type of cavity resonator. A suitable gap arrangement is placed in the interior of said cavity resonator, a means is provided for coupling energy from the oscillating field within the cavity to a second radio frequency transmission means. The device is so constructed that when a strong signal is introduced in said first transmission means, the gap in said cavity resonator breaks down. When the gap breaks down, the impedances of the circuit are such that most of the energy in the signal continues along the first wave guide; and only enough energy flows into the cavity resonator to maintain the arc at the gap. The arc at the gap makes the cavity non-resonant so no sustained oscillating field is set up within the cavity. When a weaker signal travels down said first transmission means, the gap in the cavity resonator does not break down; the cavity is resonant to the frequency of the signal so an oscillating field is set up within the cavity. The coupling means associated with said second transmission means couples some of the energy from the oscillating field in the cavity into the second transmission means. The impedances may be so arranged in some applications that all of the energy in the weaker signal enters the cavity resonator, and none continues on down the first transmission means. In previous types of T-R devices several disadvantages are encountered. First, the design of previous T-R devices does not exclude the possibility of direct coupling of energy from said first transmission means to said second transmission means. Second, the dimensions of the gap in said cavity resonator are not adjustable, and third, no means have been provided for tuning said cavity to resonance from a remote point. Means for overcoming these disadvantages are presented in copending application of Bruce B. Cork and James L. Lawson Serial No. 591,588, filed 2 May 1945, which has been abandoned. No means are provided in the above mentioned application for tuning a T-R device from a remote point.

One object of the present invention, therefore, is to provide means for tuning a T-R device from a remote point.

In accordance with the present invention there is provided a cavity resonator means having a structure supported therein. The supported structure is connected to the resonator means by conducting means. Means are also provided for electrically and mechanically tuning the resonator.

For a better understanding of the invention, together with other and further objects thereof, reference is had to the following description taken in connection with the accompanying drawings, and the scope of the invention will be pointed out in the appended claims.

In the accompanying drawings.

Figure 1:
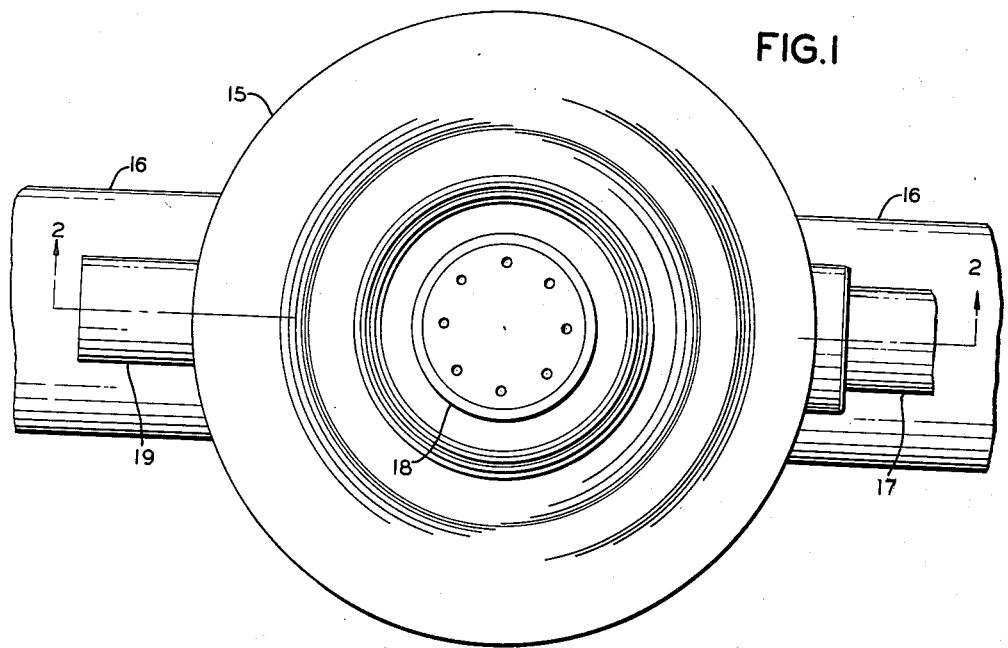
Fig. 1 is a plan view of the invention.

Referring now more particularly to Fig. 1 of the drawing, there is shown the plan view of the transmit-receive or T-R device.

Figure 2:
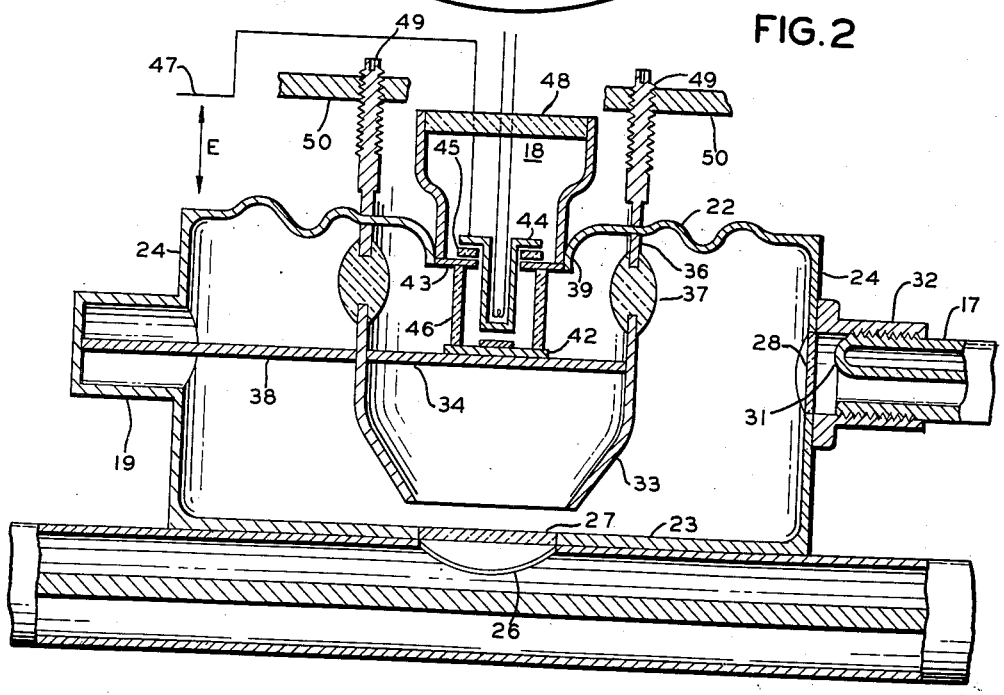
Fig. 2 is a sectional view of the invention taken along the line 2—2' of Fig. 1.

A cavity resonator 15 is connected to coaxial lines 16 and 17 in a manner that will be shown in Fig. 2. A lighthouse diode vacuum tube 18 is mounted in the center of cavity resonator 15. A lighthouse diode is a type of two electrode vacuum tube designed so that the distance from anode to cathode is very short. A radio frequency choke 19 extends from one side of cavity resonator 15 in a manner more clearly shown in Fig. 2.

Referring now to Fig. 2, there is shown a sectional view of the device shown in Fig. 1 taken along the line 2—2'. In Fig. 2 the top wall of cavity 15 is numbered 22, the bottom wall numbered 23, and the circular side wall numbered 24. Wave guide 16 has an opening 26 in the outer conductor that coincides in position with a glass or quartz window 27 in wall 23 of cavity resonator 15. A quartz window 28 in wall 24 is located at the point where coaxial line 17 joins cavity resonator 15. A coupling loop 31 is formed in the end of coaxial line 17 while connector 32 mechanically joins coaxial line 17 to cavity resonator 15.

A center post 33 which is circular in cross section is coaxially located with respect to window 27 and cavity resonator 15. Center post 33 has a transverse section 34. A supporting ring 36 is rigidly fastened to wall 22 and is joined to center post 33 by glass seal 37. An electrode 38 extends from choke 19 to center post 33. A circular opening is formed in wall 22 and the sides of the opening shaped so as to form a contact ring 39. Lighthouse diode 18 is placed in the opening in wall 22 in such a manner that anode 42 of diode 18 makes electrical contact with transverse section 34 of center post 33. Contact ring 39 makes electrical contact with cathode ring 43 of diode 18. Cathode 44 of diode 18 is separated from cathode ring 43 by a thin disk of dielectric material 45. Cathode ring 43 is also separated by dielectric material 46 from anode 42. An electrical connection 47 to cathode 44 is brought out through insulating base 48 of diode 18.

Mechanical tuning of the T-R device is indicated by screws 49 and supporting structure 50. The apparatus for accomplishing the mechanical tuning is not limited to the device shown but may be anything that will cause axial movement of center post 33. A second device for accomplishing mechanical tuning is illustrated in the above cited copending application of Bruce B. Cork and James L. Lawson.

In the operation of the device, a signal of a high energy level traveling down coaxial line 16 will cause an arc to form between center post 33 and cavity wall 23 thus excluding energy from cavity resonator 15. When a signal of low energy level passes down coaxial line 16, some of the energy will enter cavity resonator 15 and set up an oscillating field. Some of the energy in the oscillating field will be coupled with coaxial line 17 by means of coupling loop 28. The basic principles on which T-R devices operate are well known to the art and a more detailed description of a type of T-R device similar to the one shown here is found in the above mentioned copending application.

In the T-R device shown in Fig. 2, center post 33 is electrically connected to wall 22 through diode 18. Anode 42 of diode 18 is connected to center post 33 through transverse section 34. Cathode 44 is connected to cathode ring 43 for radio frequency energy by the capacitance between the cathode 44 and cathode ring 43. Cathode ring 43 makes contact with wall 22 through contact ring 39. Cathode 44 is connected to anode 42 through the electron stream. Electrode 38 is effectively isolated from wall 24 by choke 19 for radio frequency energy. A direct current potential may now be applied between connection 47 and any portion of cavity 15. In Fig. 2, this potential is represented by the letter E and is shown being applied between connection 47 and wall 22. Changing the direct current potential existing between cathode 44 and anode 42 will change the electrical characteristics of the connection of center post 33 to wall 22. This change in characteristic will affect the electrical tuning of cavity resonator 15. It is possible to vary the potential E from a remote point thus effecting tuning of the T-R device from a remote point. Adjustments of the gap provide means for mechanically tuning the cavity. The electrical tuning feature described above may be used on the more conventional type of T-R devices, but the type shown is especially well adapted for mounting the lighthouse diode.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In a T-R device comprising a cavity resonator, openings in said cavity connected to input and output circuits, electrodes in said resonator, a discharge gap between said electrodes, a direct connection between a first said electrode and a first portion of said resonator, and a connection between a second said electrode and a second portion of said resonator, said connection including in series a capacitor and a cathode-anode circuit of a lighthouse diode as an electrical circuit, and of an insulating ring seal as a mechanical support and pressure seal, said first electrode being also connected to said resonator through a high frequency choke, means for applying a variable direct current potential across said capacitor whereby the tuning of the T-R device may be varied electrically, and pressure seals on said input and output openings whereby a suitable pressure may be retained in said cavity.

2. In a T-R device comprising a cavity resonator, openings in said cavity connected to input and output circuits, electrodes in said resonator, a discharge gap between said electrodes, a direct connection between a first said electrode and a first portion of said resonator, and a connection between a second said electrode and a second portion of said resonator, said connection including in series a capacitor and a cathode-anode circuit of a lighthouse diode as an electrical circuit, said first electrode being also connected to said resonator through a high frequency choke, and means for applying a variable direct current potential across said capacitor whereby the tuning of the T-R device may be varied electrically.

3. In a T-R device comprising a cavity resonator, openings in said cavity connected to input and output circuits, electrodes in said resonator, a discharge gap between said electrodes, a direct connection between a first of said electrodes and a first portion of said resonator, and a variable impedance radio frequency circuit coupled between a second of said electrodes and a second portion of said resonator, said circuit including an electron discharge tube having a cathode and an anode, and means for applying a variable direct current potential across said cathode and anode for varying said impedance.

4. In a T-R device comprising a cavity resonator, openings in said cavity resonator connected to input and output circuits, electrodes in said resonator, a discharge gap between said electrodes, a direct connection between a first said electrode and a first portion of said resonator, and a connection between a second said electrode and a second portion of said resonator, said connection including in series a capacitor and a diode cathode-anode circuit, said first electrode being also connected to said resonator through a high frequency choke, and means for applying a variable direct current potential across said capacitor whereby the tuning of the T-R device may be varied electrically.

5. A T-R device comprising a transmission channel having an opening at an intermediate point thereof, a cavity resonator having an input opening communicating with the opening in said transmission channel, said cavity resonator having a second opening connected to an output circuit, electrodes having a discharge gap therebetween in said cavity resonator, a direct connection between a first of said electrodes and a first portion of said cavity resonator, and a radio frequency circuit connecting the other of said electrodes to a second portion of said cavity resonator, said circuit including an electron discharge tube having a cathode and an anode, and means for applying a variable direct current potential across said cathode and anode for varying the impedance of said radio frequency circuit.

BRUCE B. CORK.

REFERENCES CITED

The following references are of record in the file of this patent:

UNITED STATES PATENTS

| Number | Name | Date |
| --- | --- | --- |
| 2,241,976 | Blewett et al. | May 13, 1941 |
| 2,242,249 | Varian et al. | May 20, 1941 |
| 2,403,302 | Richmond | July 2, 1946 |